United States Patent
Jaeger

(10) Patent No.: US 6,626,321 B2
(45) Date of Patent: Sep. 30, 2003

(54) BIN FOR COLLECTING VALUABLE BIOLOGICAL MATERIALS

(76) Inventor: Georg Jaeger, Am Mühlberg 1-1a, D-82319 Starnberg (DE)

( * ) Notice: Subject to any disclaimer, the term of this patent is extended or adjusted under 35 U.S.C. 154(b) by 0 days.

(21) Appl. No.: 09/904,402

(22) Filed: Jul. 12, 2001

(65) Prior Publication Data

US 2001/0050284 A1 Dec. 13, 2001

Related U.S. Application Data

(63) Continuation-in-part of application No. PCT/EP00/00081, filed on Jan. 7, 2000.

(30) Foreign Application Priority Data

Jan. 18, 1999 (DE) .................................... 299 00 626 U

(51) Int. Cl.[7] .................................................. B65D 1/24
(52) U.S. Cl. .................... 220/571; 220/23.87; 220/501; 220/908.1
(58) Field of Search .............................. 220/908, 908.1, 220/23.87, 23.89, 501, 529, 531, 627, 737, 6, DIG. 6, 571, 572, 913; 210/455, 464, 469, 473, 477

(56) References Cited

U.S. PATENT DOCUMENTS

| | | | | |
|---|---|---|---|---|
| 2,234,596 A | * | 3/1941 | Heilman | 126/275 R |
| 2,319,872 A | * | 5/1943 | Leonard | 220/23.87 |
| 2,533,524 A | * | 12/1950 | Snider | 220/23.87 |
| 3,074,583 A | * | 1/1963 | Martinich, Jr. | 220/908 |
| 4,247,130 A | * | 1/1981 | Paterson | 280/654 |
| 5,031,796 A | | 7/1991 | Schaefer et al. | |
| 5,913,444 A | * | 6/1999 | Steiner | 206/427 |

FOREIGN PATENT DOCUMENTS

| | | |
|---|---|---|
| DE | 3517262 C1 | 8/1986 |
| DE | 29703055 U1 | 6/1997 |
| EP | 0502365 A1 | 9/1992 |
| WO | WO 95/01294 | 1/1995 |

* cited by examiner

Primary Examiner—Stephen Castellano
(74) Attorney, Agent, or Firm—Jordan and Hamburg LLP

(57) ABSTRACT

Bin for collecting biological materials including a container having a bottom floor, side walls and a lid which can be opened, and at least one opening for the passage of air. Side gratings are arranged in an interior of the vessel and at a distance from an adjacent side wall. The gratings are connected to the vessel. A bottom grating is arranged at a distance from the floor of the vessel and pivotally mounted to the side gratings to pivot inward into a space between the side gratings. Intermediate spaces are present between the side gratings and the respective adjacent side wall and connected with the air passage opening(s). An insert for converting a commercial refuse bin into a bin of this type includes two side gratings and fastening or fixing elements for mounting the side gratings fixedly to the side wall of the refuse bin.

25 Claims, 1 Drawing Sheet

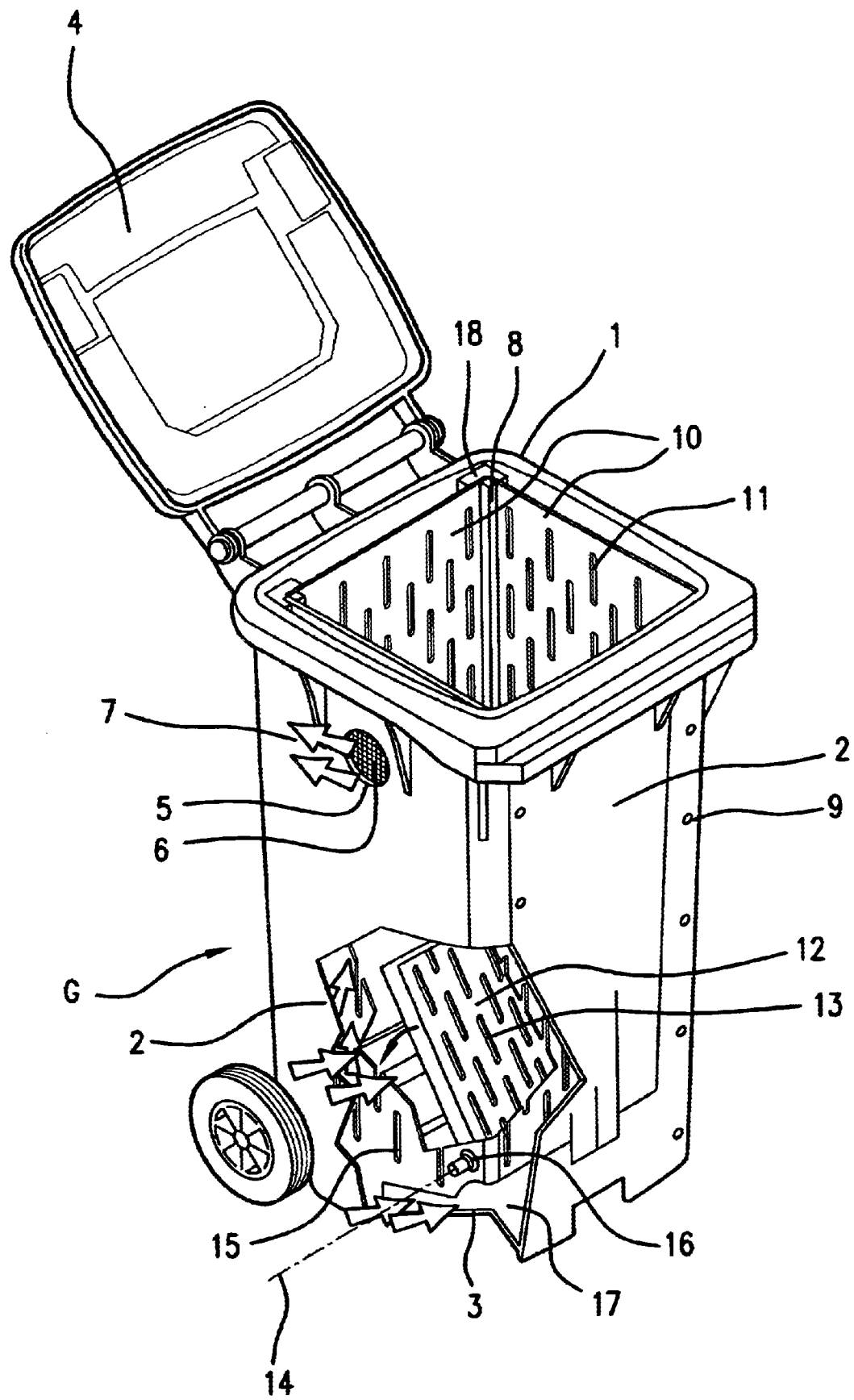

BIN FOR COLLECTING VALUABLE BIOLOGICAL MATERIALS

REFERENCE TO RELATED APPLICATION

This is a continuation-in-part of PCT/EP00/00081, filed Jan. 7, 2000.

FIELD OF THE INVENTION

The present invention relates to a bin for collecting valuable biological materials comprising a vessel which has a bottom, side walls and a lid, which can be opened, and has at least one opening for the passage of air.

BACKGROUND OF THE INVENTION

With the background knowledge that resources for raw materials as well as dumping space for waste materials are limited, aspects of the control of recycling have entered into the disposal of waste in recent years. One aspect of this is the separate collection of organic waste, especially kitchen and garden waste, in order to convert this waste in composting plants into compost which is used as a soil improver in the agricultural and horticultural industries as well as in agriculture and horticulture.

The separate collection of valuable biological materials, on the hand, and the remainder of garbage, on the other, coupled in part with a separate collection of materials that can be recycled, such as plastics, glass, metals and/or paper, frequently is associated with a considerable increase in the disposal fees. The costs of the treatment of the valuable biological materials in the composting plant play a lesser role here because they are frequently covered more or less by the proceeds achieved by the sale of the finished compost. On the other hand, the collection and transporting costs have a decisive effect on these additional costs. In this connection, it is of fundamental importance that, especially in warm regions and during the summer months, emptying intervals of a week or, in some cases, even appreciably less, are required for hygienic reasons. This is the case especially when conventional waste barrels are used for collecting valuable biological materials since anaerobic decomposition processes take place especially in wet kitchen waste under the influence of heat and with the exclusion of air and are associated with, at times, unpleasant emissions of odors and health-endangering emissions of fungi, germs and spores. In addition, in the closed waste barrels used to collect valuable biological materials, a climate exists, in which vermin can reproduce particularly well.

In order to suppress the occurrence of anaerobic processes in the collective valuable biological materials, conventional waste barrels have already been provided with openings for the passage of air, especially in the side walls and/or in the lid. In some cases, such barrels, provided with openings for the passage of air, were additionally equipped with ribs in the region of the inner surfaces of the side walls. These ribs prevented contact between the valuable biological materials and the openings for the passage of air and, in this way, were intended to improve the ventilation (see, for example, U.S. Pat. No. 5,031,796). Moreover, a hinged bottom grating is fastened to the rear wall of the vessel. However, these known collecting bins prove to be hardly better than conventional, closed, collecting bins without openings for the passage of air, because relatively wet, small-format and smooth kitchen waste, such as potato peels and the like, tend to adhere between the ribs at the inner surfaces of the side walls of the barrel and, in this way, obstruct the openings for the passage of air. As a consequence, the same anaerobic decaying and fermentation processes take place in the collected valuable biological materials, as in closed waste barrels without openings for the passage of air. Accordingly, when these known collecting bins are used, especially in hot regions and/or months, cost-intensive emptying plans with short emptying intervals of a week or less are also unavoidable, in order to satisfy hygienic requirements.

Further proposals to retrofit existing waste barrels by ventilation inserts, so that they become particularly suitable for collecting waste that can be composted, are described in DE 35 17 262 C1, WO 95/01294, DE 297 03 055 U1 and EP 0 502 365 A1. For example, it is proposed in DE 35 17262 C1 that a screen insert in the form of a basket be used in a conventional standard bin for collecting waste, the walls of the screen insert maintaining a distance from the side walls of the waste bin, in order to bring about, in conjunction with the openings for the passage of air provided in the side walls of the waste bin, a ventilation for the waste which can be composted and is taken up in the screen insert. The International Publication No. WO 95/01294 also discloses a corresponding combination of a conventional waste bin with a basket-like screen insert which is taken up in the waste bin. However, it is additionally proposed here that a woven or perforated supporting bag and, in this, in turn, a paper bag, be taken up in the basket-like screen insert, the paper bag being closed when being emptied so that it slides easily out of the supporting bag.

The German Patent Publication No. DE 297 03 055 U1 discloses different constructions of collecting bins which are equipped for collecting waste that can be composted and for which in each case at least one ventilating grating is provided. The possibilities are disclosed of assigning a ventilating grating to a side wall or of assigning a flat or angled ventilating grating to two adjacent corner regions for forming venting shafts.

The European Patent Publication No. EP 0 502 365 A1 discloses a waste collecting bin for compostable waste. A venting region is defined by means of a profiled venting element arranged at a distance from the rear wall of the bin. In addition, a pivotable bottom grating is provided which is mounted at the venting element.

These prior art constructions have the common disadvantage that a relatively inexpensive collection of valuable biological materials cannot be achieved with the disclosed collecting bins. Accordingly, some of the expenditure associated with the manufacture of the collecting bin is quite high. Moreover, in some cases, under unfavorable circumstances (see above), anaerobic fermentation processes proceed in the known collecting bins and, for reasons of hygiene, require a cost-effective emptying with short emptying intervals. The remaining useful volume, which is much too small, also requires short emptying cycles, as a result of which high collection costs result.

From this, the objective of the present invention is derived and consists of providing a collecting bin of the above-named type, which makes the relatively inexpensive collection of valuable biological materials possible.

SUMMARY OF THE INVENTION

In accordance with the present invention, this objective is accomplished by providing in the interior of the vessel, two mutually opposite side gratings arranged at a distance from the adjacent side walls, the spaces between the side gratings and the respectively adjacent side walls being connected with the at least one opening for the passage of air.

Furthermore, a bottom grating is provided which is arranged at a distance from the bottom of the vessel. The bottom grating is mounted pivotably to the two mutually opposite side gratings.

The collecting bins in accordance with the invention are distinguished because at least one portion of the side walls is assigned to a back-ventilated side grating. Moreover, a side grating can be assigned to each of the side walls of the bin. Within the scope of the present invention, however, it is also possible to assign side gratings to only a portion of the side walls.

The space between the bottom of the vessel and the bottom grating forms a seepage water storage area in which excess water of valuable biological materials filled into the collection bin dripping wet is collected. Such a reservoir of liquid is particularly advantageous for the miniclimate which develops in the collection bin. The liquid in the seepage water storage area prevents an excessively dry miniclimate in the collecting bin, the development of the putrefaction, which occurs in conventional waste barrels in the region of valuable biological materials lying in the seepage water, being prevented at the same time.

The pivotable suspension of the bottom grating, which has been described, is useful especially for ensuring that small-format valuable biological material, which may have fallen through the bottom grating, is emptied when the collecting bin is emptied. When the collecting bin is inverted for the purpose of emptying it, the pivotably mounted bottom grating swivels into the interior of the collecting bin so that small-format valuable biological materials present in the seepage water storage area can fall out of the collecting bin without hindrance. This leads to a self cleaning of the collecting bin so that the regular cleaning process, which is required for the state of the art, can be omitted.

An advantage of the present invention, which is particularly significant from a cost viewpoint, is that the side gratings can be part of an insert which is installed in a conventional commercial barrel which may already have openings for the passage of air, or in a different conventional commercial bin (such as a 1.1 $m^3$ cart). In this manner, the side gratings can be held particularly over fastening elements which are mounted on the inside at the side walls of the bin, and simultaneously fulfill the function of spacers. For example, a set which is used for retrofitting a conventional commercial waste barrel so as to form a collecting bin in accordance with the invention may comprise four fastening rails and/or a plurality of spacers which are to be placed between side gratings and side walls, and two side gratings, as well as optionally a bottom grating (see below). The fastening rails and/or spacers are fastened (for example, clipped or screwed) on the inside to the side walls of the barrel and the side gratings are subsequently inserted in the fastening rails or set down on the spacers and secured against falling out.

By means of the present invention, an outstanding aeration of the valuable biological materials collected in the collecting bin is ensured which is due partially to fact that the collected valuable biological materials are kept by the side gratings away from the side walls in question of the bin. In this manner, obstruction blockage and/or coverage of the openings for the passage of air arranged in the side walls are prevented. The perforation of the side gratings ensures that the collected valuable biological materials are aerated over a large area. Without the side gratings, provided pursuant to the invention, this would not be possible because a large area perforation of the side walls without side gratings would lead to the loss of valuable biological materials from the collecting bin.

The advantages associated with the present invention can be summarized as follows. The good aeration of the collected valuable biological materials prevents the occurrence of anaerobic processes in the collecting bin. Instead, aerobic decaying already commences in the valuable biological materials collected. The bothersome and/or health-harming emissions, which are developed in the state of the art, are reduced in this way to a level in which they are practically no longer relevant. As a consequence of this, economically long emptying cycles of eight weeks or even longer or emptying cycles, which depend only on the filling capacity, can be maintained even in warm regions and/or during the summer months, if the collecting bin in accordance with the invention is used. In contrast to when known generic collecting bins are used, there no longer is any need for emptying incompletely filled collecting bin, only for reasons of hygiene. In this manner, the costs associated with the collection of valuable biological materials can be reduced drastically. In addition, the aerobic processes taking place in the collecting bins in accordance with the invention lead to decaying of the collected valuable biological materials. This favors and accelerates the subsequent decaying in the composting plant. Moreover, as a result of the decaying taking place in the collecting bin, the weight of the collected valuable biological materials is reduced appreciably and the collected valuable biological materials settle or collapse. In this manner, the collection bin can receive more valuable biological material in the period up to the next emptying than it could without the decaying achieved by the invention. The useful volume of the bin, reduced by the built-in side gratings, is substantially compensated for by the settling of the collected valuable biological materials taking place during the decaying. In spite of the reduced useful volume, more valuable biological materials can be collected with the collecting bin in accordance with the invention within the correspondingly extended emptying interval than can be collected with the known, generic, collecting bins of the same external dimensions. Moreover, the waste collection vehicle, into which the collection bin is emptied, carries less excess water.

As a result of the reduced emissions, an increased acceptance of collecting biologically valuable materials is a direct effect of the present invention.

The present invention similarly is suitable for being realized in conjunction with barrels as well as other vessels (such as 1.1 $m^3$ carts).

In accordance with a first, preferred, further development of the invention, the at least one opening in the vessel for the passage of air is arranged in the side wall of the vessel. For collecting bins in accordance with the invention which are intended for use in temperate zones, the provision of two openings for the passage of air, which are arranged in opposite side walls of the bin, is particularly preferred. Particularly advantageous conditions for the exchange of air, which favor efficient decaying, are obtained in this manner. Moreover, the openings for the passage of air can be constructed particularly as recesses in the side wall, in which an insect filter (fly screen) is inserted.

The side gratings, which are to be used within the scope of the present invention, can have relatively large format perforations throughout, which favors the exchange of air. With the exchange of air through the large perforations, the decaying process within the collecting bin, needed because small format valuable biological materials which fall through the side gratings, reaches the cavity existing between the side grating in question and the associated side wall of the vessel. These small format valuable biological materials are also emptied into the collecting vehicle during the normal emptying process of the collection bin. It has proven to be particularly advantageous if the perforations of the side grating comprises vertical slots. These are disposed in several rows, preferably offset to one another.

A drain can be connected to the seepage water storage areas, which are described above. This drain can be constructed in the form of an overflow which prevents the level of the seepage water rising above the bottom grating. The drain may, however, also be used for selectively removing seepage water which is suitable for producing a liquid soil nourishment.

The present invention is not limited with respect to the number of side gratings. Accordingly, four side gratings can be provided in collection bins, the vessels of which have four side walls. However, two side gratings, which are arranged opposite to one another, are usually already sufficient for advantageous conditions within the collection bin. In this case, the collection bin has a holding capability, which is larger than when four side gratings are used. It is also possible, for example, to provide three side gratings.

BRIEF DESCRIPTION OF THE DRAWING

A preferred example of the collection bin in accordance with the invention is explained in greater detail below with reference to the accompanying drawing which is a perspective view, partly broken away, showing a collecting bin in accordance with the invention.

DETAILED DESCRIPTION OF THE INVENTION

The drawing shows a perspective view of a collection bin in accordance with the invention which is the result of the retrofitting of a conventional, waste barrel on rollers which is used as vessel G. The barrel 1 comprises four side walls 2, a bottom 3 and a lid 4, which can be swiveled up. To this extent, the barrel 1 corresponds to the state of the art, which is adequately known and widespread so that further explanations are not required.

Recesses 5 are introduced in two opposite side walls 2 of the barrel 1. A fly screen 6 secures the recesses 5 against entry of vermin into the interior of the barrel. The recesses 5 form the openings 7 for the passage of air.

Four fastening rails 8 are screwed to the inner surfaces of the side walls 2 by means of screws 9, which pass through the side wall 2 of the barrel 1 in question. Four side gratings 10 are inserted in the fastening rails 8, the side gratings 10 maintaining a distance of about 10 to 20 mm from the respectively assigned side wall 2. The side gratings 10 have perforations in the form of vertical slots 11.

A bottom grating 12, which also has perforations in the form of slots 13, is mounted so that it can swivel about a horizontal axis 14. For this purpose, two axle stubs 15, connected with the bottom grating 12, are taken up rotatably in bearings 16, which are provided in two mutually opposite side gratings 10. If the barrel is inverted for the purpose of emptying it, the bottom grating 12 swivels into the interior of the barrel. Valuable biological materials, which have passed through the bottom grating 12 and reach the seepage water storage area 17 situated below the grating 12, can be emptied without problems. Moreover, the side gratings 10 are prevented from falling out by means of the holding plates 18 placed on the fastening rails 8.

What is claimed is:
1. A collecting bin for collecting valuable biological materials comprising:

a vessel having a bottom, side walls and a lid which can be opened, and at least one opening for the passage of air;

two mutually opposite side gratings arranged in an interior of said vessel and at a distance from an adjacent one of said side walls of said vessel, said side gratings being fixedly secured to said vessel; and a bottom grating arranged at a distance from the bottom of said vessel and pivotally mounted to said side gratings to pivot inward into a space between said side gratings, wherein spaces between said side gratings and the respective adjacent one of said side walls are connected with said at least one opening for the passage of air, and wherein at least one of said side walls of said vessel has an opening for the passage of air.

2. The collecting bin of claim 1, wherein the opening for the passage of air in said at least one side wall comprises a recess, further comprising an insect filter inserted in said recess.

3. The collecting bin of one of claim 1 or 2, wherein two mutually opposite side walls of said vessel have openings for the passage of air.

4. The collecting bin of one of claim 1 or 2, wherein said side gratings are part of an insert built into a conventional commercial barrel which forms said vessel.

5. The collecting bin of claim 1, further comprising fastening elements arranged to fixedly secure said side gratings to said side walls of said vessel.

6. The collecting bin of claim 1, wherein said side gratings comprise vertical slots.

7. The collecting bin of claim 1, further comprising a seepage water storage area situated below said bottom grating.

8. The collecting bin of one of claims 1, 2 and 7, further comprising two additional side gratings such that a total of four side gratings are provided.

9. The collecting bin of one of claims 1, 2 and 7, wherein two side gratings are provided.

10. The collecting bin of claim 1, further comprising fastening means for fastening said side gratings to said vessel.

11. The collecting bin of claim 1, further comprising fastening elements mounted on an interior of said side walls of said vessel and arranged to fixedly secure said side gratings in said vessel.

12. The collecting bin of claim 5, wherein said fastening elements comprise fastening rails and attachment means for attaching said fastening rails to said side walls of said vessel.

13. The collecting bin of claim 12, wherein said side gratings are insertable into fasting rails.

14. The collecting bin of claim 5, wherein said fastening elements are arranged to position said side gratings at a distance of about 10 mm to 20 mm from said side walls of said vessel.

15. The collecting bin of claim 1, wherein said bottom grating includes perforations and defines a water seepage area below said bottom grating and above said bottom of said vessel.

16. The collecting bin of claim 1, wherein said side gratings have perforations arranged in rows and offset from one another.

17. A kit for retrofitting a conventional commercial waste barrel to form a collecting bin for collecting valuable biological materials, comprising:

at least two side gratings;

a bottom grating pivotally mounted to said at least two side gratings to pivot inward into a space between said at least two side gratings; and fastening elements structured and arranged to fixedly secure said at least two side gratings to side walls of the waste barrel;

wherein said fastening elements comprise fastening rails and attachment means for attaching said fastening rails to the side walls and wherein said fastening elements further comprise holding plates placed on said fastening rails for preventing said side gratings from being removed from said fastening rails.

18. The kit of claim 17, wherein said side gratings are insertable into said fastening rails.

19. The kit of claim 17, wherein said fastening elements are arranged to position said side gratings a distance of about 10 mm to 20 mm from the side walls.

20. The kit of claim 17, wherein said at least two side gratings comprise a pair of opposed side gratings, said bottom grating being pivotally mounted to said pair of opposed side gratings.

21. The kit of claim 17, wherein said side gratings have perforations arranged in rows and offset from one another.

22. A collecting bin for collecting valuable biological materials comprising:

a vessel having a bottom, side walls and a lid which can be opened, and at least one opening for the passage of air;

two mutually opposite side gratings arranged in an interior of said vessel and at a distance from an adjacent one of said side walls of said vessel, said side gratings being fixedly secured to said vessel;

a bottom grating arranged at a distance from the bottom of said vessel and pivotally mounted to said side gratings to pivot inward into a space between said side gratings, wherein spaces between said side gratings and the respective adjacent one of said side walls are connected with said at least one opening for the passage of air; and fastening elements arranged to fixedly secure said side gratings to said side walls of said vessel, wherein said fastening elements comprise fastening rails and attachment means for attaching said fastening rails to said side walls of said vessel and wherein said attachment means comprise screws.

23. A collecting bin for collecting valuable biological materials comprising:

a vessel having a bottom, side walls and a lid which can be opened, and at least one opening for the passage of air;

two mutually opposite side gratings arranged in an interior of said vessel and at a distance from an adjacent one of said side walls of said vessel, said side gratings being fixedly secured to said vessel;

a bottom grating arranged at a distance from the bottom of said vessel and pivotally mounted to said side gratings to pivot inward into a space between said side gratings, wherein spaces between said side gratings and the respective adjacent one of said side walls are connected with said at least one opening for the passage of air; and fastening elements arranged to fixedly secure said side gratings to said side walls of said vessel, wherein said fastening elements comprise fastening rails and attachment means for attaching said fastening rails to said side walls of said vessel, wherein said side gratings are insertable into said fastening rails and wherein said fastening elements further comprise holding plates placed on said fastening rails for preventing said side gratings from being removed from said fastening rails.

24. A kit for retrofitting a conventional commercial waste barrel to form a collecting bin for collecting valuable biological materials, comprising:

at least two side gratings;

a bottom grating pivotally mounted to said at least two side gratings to pivot inward into a space between said at least two side gratings; and fastening elements structured and arranged to fixedly secure said at least two side gratings to side walls of the waste barrel;

wherein said fastening elements comprise fastening rails and attachment means for attaching said fastening rails to the side walls and wherein said attachment means comprise screws.

25. A collecting bin for collecting valuable biological materials comprising:

a vessel having a bottom, side walls and a lid which can be opened, and at least one opening for the passage of air;

two mutually opposite side gratings arranged in an interior of said vessel and at a distance from an adjacent one of said side walls of said vessel, said side gratings being fixedly secured to said vessel;

a bottom grating arranged at a distance from the bottom of said vessel and pivotally mounted to said side gratings to pivot inward into a space between said side gratings, wherein spaces between said side gratings and the respective adjacent one of said side walls are connected with said at least one opening for the passage of air; and two additional side gratings such that a total of four side gratings are provided.

* * * * *